United States Patent [19]

Tanaka

[11] Patent Number: 4,799,568
[45] Date of Patent: Jan. 24, 1989

[54] FRONT COVER FOR MULTI-WHEELED VEHICLES

[75] Inventor: Koichi Tanaka, Tokyo, Japan

[73] Assignee: Honda Giken Kogyo Kabushiki Kaisha, Tokyo, Japan

[21] Appl. No.: 136,533

[22] Filed: Dec. 22, 1987

Related U.S. Application Data

[63] Continuation of Ser. No. 894,350, Aug. 7, 1986, abandoned.

[30] Foreign Application Priority Data

| Aug. 7, 1985 | [JP] | Japan | 60-120999[U] |
| Oct. 4, 1985 | [JP] | Japan | 60-221588 |
| Oct. 4, 1985 | [JP] | Japan | 60-221515 |

[51] Int. Cl.⁴ .................... B62J 17/06; B60K 11/02
[52] U.S. Cl. .................... 180/219; 180/229; 296/78.1
[58] Field of Search .......... 180/219, 229; 280/289 R, 289 S, 289 H; 296/78.1, 194

[56] References Cited

U.S. PATENT DOCUMENTS

| 3,922,031 | 11/1975 | Hogon | 296/78.1 |
| 4,198,093 | 4/1980 | Muth et al. | 296/78.1 |
| 4,372,602 | 2/1983 | Tsuchiya et al. | 296/78.1 |
| 4,413,700 | 11/1983 | Shiratsuchi | 180/209 |
| 4,461,508 | 7/1984 | Ogishima | 280/289 S |
| 4,514,006 | 4/1985 | Maruoka | 296/78.1 |
| 4,519,473 | 5/1985 | Ochiai et al. | 180/229 |
| 4,557,345 | 12/1985 | Hamane et al. | 180/229 |
| 4,564,081 | 1/1986 | Hamane et al. | 180/229 |
| 4,648,650 | 3/1987 | Fujii et al. | 180/219 |

FOREIGN PATENT DOCUMENTS

| 58-36780 | 3/1983 | Japan . |
| 58-128924 | 8/1983 | Japan . |
| 59-42775 | 3/1984 | Japan . |
| 59-45181 | 3/1984 | Japan . |
| 59-48278 | 3/1984 | Japan . |
| 59-48279 | 3/1984 | Japan . |
| 59-48280 | 3/1984 | Japan . |
| 59-53281 | 3/1984 | Japan . |
| 59-97184 | 7/1984 | Japan . |
| 59-114179 | 7/1984 | Japan . |
| 59-128068 | 7/1984 | Japan . |

Primary Examiner—David M. Mitchell
Assistant Examiner—Donn McGiehan
Attorney, Agent, or Firm—Lyon & Lyon

[57] ABSTRACT

The present invention is directed to a front cover for a multi-wheeled vehicle. Although such vehicles typically take the form of a motorcycle, motor scooter or a motor tri-cycle, no such limitations are inherent in the present invention. Rather, the present invention provides an aerodynamically efficient front cover for covering the front portion of such a multi-wheeled vehicle body forward of a head pipe and includes a front surface and at least two side surfaces. Auxiliary member such as headlights, radiators, horns or the like may be positioned within the protected area of the front cover. An inspection lid for covering the mounting portion of the handlebars and facilitating inspection of the auxiliary members is removably mounted between the opposite side surfaces of the front cover. Aternative embodiments include means of mounting a windshield and a headlight shield in a common plane and flush with the front cover. An embodiment is also provided wherein the front cover is divided into a plurality of sections, each of which may be independently removed from the front cover so as to permit repair of damaged portions of the front cover or to vary the air flow characteristics of the front cover.

12 Claims, 8 Drawing Sheets fig. 1.

FRONT COVER FOR MULTI-WHEELED VEHICLES

This application is a continuation of application Ser. No. 894,350, filed Aug. 7, 1986, now abandoned.

BACKGROUND

The field of the present invention is multi-wheeled vehicles and, in particular, front covers for multi-wheeled vehicles.

In multi-wheeled vehicles such as motorcycles, scooters, motor tri-cycles or the like, a front cover for covering the front portion of a vehicle body may be provided forward of the head pipe so as to provide some protection for the rider. On such vehicles, a radiator, if any, is preferably located as far forward of the vehicle body as possible in order to assure a high cooling efficiency. Thus, it is necessary to provide space and cooling ability according to such needs.

Often times where a multi-wheeled vehicle has a front cover to protect the rider, a portion of such front cover may be damaged or variations in such front cover may be desirable in order to accommodate certain conditions. Since most such covers are of integral construction, the replacement of a damaged portion in said front cover is complex and very expensive. Additionally, such covers often have severe limitations in their ability to accommodate desirable variations in shape and construction.

Furthermore, the top bridge on which the steering mechanism of such vehicle is mounted is typically connected directly to the handle bar steering mechanism of such device. So configured, there is no spacing between the handle bar and the top bridge which makes electrical wiring and other connections between various components such as a speedometer, a headlight and blinkers and the like, quite difficult and susceptible to wear and breakage due to repeated movement or frictional contact.

Finally, improperly positioned covers often permit the waste heat from the radiator to flow onto the rider contributing to the rider's discomfort. Moreover, such covers permit rain and dust and the like to enter into the area containing the various multi-wheeled vehicle components, thereby requiring greater maintenance by the vehicle operator. As will be understood to those skilled in the art, it is desirable to provide a front cover which avoids these difficulties.

SUMMARY OF THE INVENTION

The present invention provides a front cover for a multi-wheeled vehicle wherein said front cover is located forward of the vehicle head pipe so as to permit an auxiliary member such as a headlight to be located in a position within protective confines of the walls of the front cover. Additionally, the front cover of the present invention provides a removable cover for the mounting portion of the steering mechanism for a front steering member and the rearward portion of the auxiliary member which permits movement and a said steering member without movement or frictional contact with the electrical wires and connections or the like. Alternative embodiments provide the ability to remove selected sections of the front cover and to mount a windshield and headlight shield in a common plane to the front cover.

As such, it is an object of the present invention to provide a cover steering device mounting structure which will permit multiple wires and other connections to be fitted there through and minimizes the amount of movement of such connections as the steering apparatus is turned.

It is a further object of the present invention to provide a front cover member which will inhibit rain, dust and the like from entering into the area of the multi-wheeled vehicle behind the front cover.

It is a further object of the present invention to provide a front cover which inhibits waste heat from a radiator from flowing onto a rider of a multi-wheeled vehicle.

It is a further object of the present invention to provide a front cover which permits a radiator and other components to be located at a forward position of a multi-wheeled vehicle body and which is aerodynamically efficient during running of the vehicle.

It is a further object of the present invention to provide a front cover for a multi-wheeled vehicle wherein it is possible to replace a damaged component of the front cover.

It is a further object of the present invention to provide a front cover for a multi-wheeled vehicle wherein the area permitting air flow through the front cover may be varied. Other and more detailed objects of the present invention will become known to those skilled in the art upon review of the present disclosure.

BRIEF DESCRIPTION OF THE DRAWINGS

The present invention will be described more fully herein with reference to the accompanying drawings, wherein.

DETAILED DESCRIPTION OF THE PREFERRED EMBODIMENT

The first preferred embodiment of the present invention is illustrated in FIGS. 1–6. Referring to the figures, a multi-wheeled vehicle 10 has a body frame constructed of steel pipes or the like including a head pipe 12 and a main body frame 14 contiguous to and curved downwardly from the head pipe 12 and extending toward the rear of the body of the multi-wheeled vehicle 10. A front fork 11 carrying a front wheel "FW" at the bottom end thereof is rotatably supported by the head pipe 12. The main body frame 14 includes a pair of left and right lower main frames 16 and an upper main frame 18 which are located in a mutually spaced relationship at the apices of a triangle.

Figure 1:
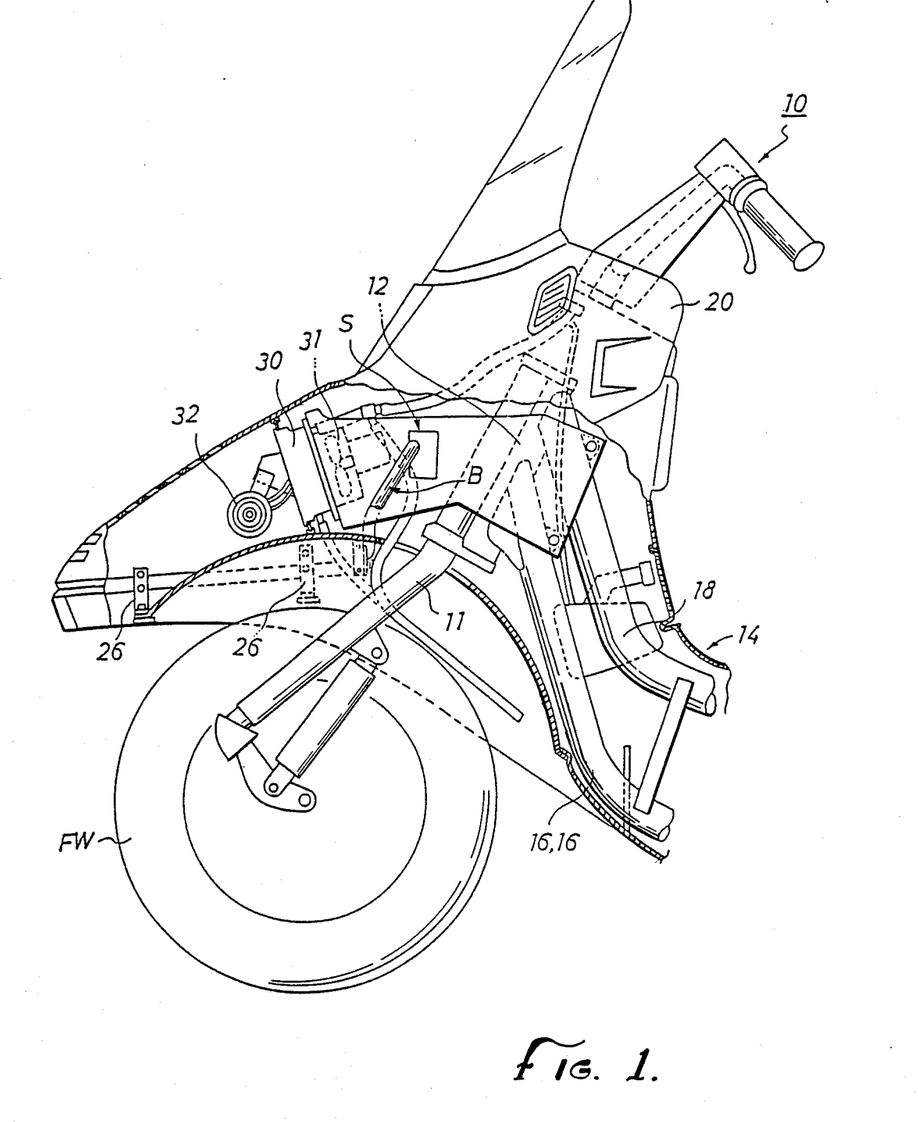
FIG. 1 is a side elevational view, partly in section, of the front part of a multi-wheeled vehicle having a first embodiment of a front cover according to the present invention.
Figures 2, 3, 4:
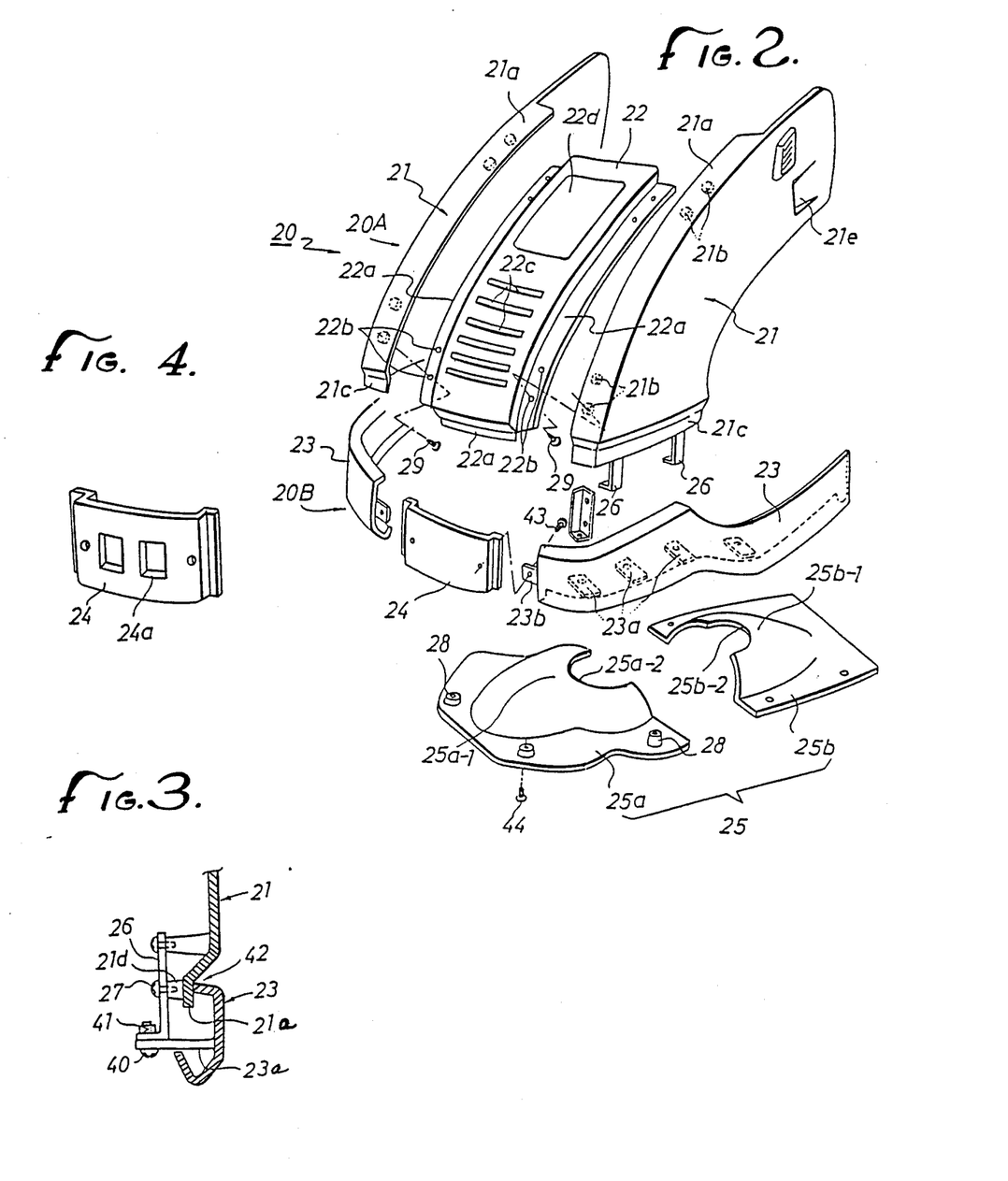
FIG. 2 is a fragmentary prospective view of a first embodiment of a front cover according to the present invention.
FIG. 3 is a cross-sectional front elevational view showing the upper and lower portions of a first embodiment of a front cover of the present invention in a coupled condition.
FIG. 4 is a prospective view of a second embodiment of a center guard portion.

Power is provided to the multi-wheeled vehicle 10 through a not-shown water cooled engine. According to the present invention, the front portion of the multi-wheeled vehicle 10 is provided with a front cover 20 as shown most clearly in FIG. 1. Various parts may be accommodated in the space between the front cover 20 and the multi-wheeled vehicle 10 including a radiator fan 30, a radiator 31 and a horn 32. As shown in FIGS. 1 and 2, a front cover supporting stay "B", a connecting plate "L", and a radiator stay "S" are also present on the multi-wheeled vehicle.

The first embodiment of a front cover 20 according to the present invention includes an upper component 20A and a lower component 20B. The upper component 20A serves as a main body while the lower component 20B serves as a protecting under guard. The upper and lower components 20A and 20B, respectively, each include three principle assemblable parts. In particular, the upper component 20A includes a pair of side covers 21 and a center cover 22, positioned between the side covers 21. Similarly, the lower component 20B includes a pair of side guards 23 and a center guard 24, arranged between the side guards 23. An inner fender 25 including two divisional pieces 25a and 25b is arranged so as to cover and protect the lower face or bottom of the front cover 20.

The center cover 22 of the upper component 20A of the front cover 20 has recessed flanged portions 22a formed along the peripheral edges of the longitudinal sides and the lower longitudinal end thereof. Threaded holes 22b are provided in the flanged portion 22a which extends from the longitudinal sides of the upper center cover portion 22. A louver 22c formed from a plurality of slits is provided in the lower central portion of the center cover 22. In addition, the center cover 22 is provided with an opening 22d in the upper central portion thereof for accommodating some auxiliary component such as a headlight or the like.

Each of the upper side covers 21 is provided with an inwardly bent flanged portion 21a formed along the upper longitudinal side thereof, cooperating with the flanged portions 22a extending from the longitudinal sides of the center cover 22 when the front cover upper portion 20A is in a substantially assembled condition. A plurality of cylindrical screw seats 21b are located on and extend inwardly from the side bent flanged portions 21a. Additionally, each of the upper side covers 21 has a recessed flanged portion 21c formed along the periphery of the longitudinal lower end of said side covers 21.

As shown in FIG. 3, screw seats 21d are located on and extend from the inner wall of the lower longitudinal end flangèd portion 21c. A connecting member 26 is coupled to the screw seats 21d by connecting means such as a rivot 27 or the like. In addition, each of the upper side covers 21 is provided with a wind exhaust port 21e formed near the upper longitudinal end thereof.

As stated above, the lower component 20B of the front cover 20 includes a pair of side guards 23 and a center guard 24. As shown most clearly in FIG. 3, each of the side guards 23 of the lower component 20B is bent so as to have a substantially C-shaped cross-section. As shown most clearly in FIG. 2, a plurality of flanged members 23a are formed on and extend from an inner wall of each of the lower side guards 23 along the lower longitudinal edge thereof. In addition, a connecting flange member 23b extends from the forward longitudinal end of each of the side guards 23.

A lower center guard 24 is also provided. As shown most clearly in FIGS. 2 and 4, a flange is provided on two opposite sides of the center guard. Although the center guard 24 shown in FIG. 2 is of solid construction, an alternative embodiment shown in FIG. 4 includes a pair of air circulation apertures 24a formed therein.

The inner fender 25 includes divisional pieces 25a and 25b, respectively. Upward projections, 25a-1 and 25b-1 respectively, are formed in the mid-portion of each inner fender divisional piece, 25a and 25b, respectively, so as to accommodate the front wheel "FW" when the inner fender 25 is connected to the assembled front cover 20. Each of the divisional pieces 25a and 25b also include a semi-circular slot 25a-2 and 25b-2, respectively, formed in adjacent connecting portions thereof and constituting a through-hole through which the multi-wheeled vehicle front fork 11 may extend. Post-formed screw seats 28 extend from the upper face of the forward divisional piece 25a of the inner fender 25.

Figure 6:
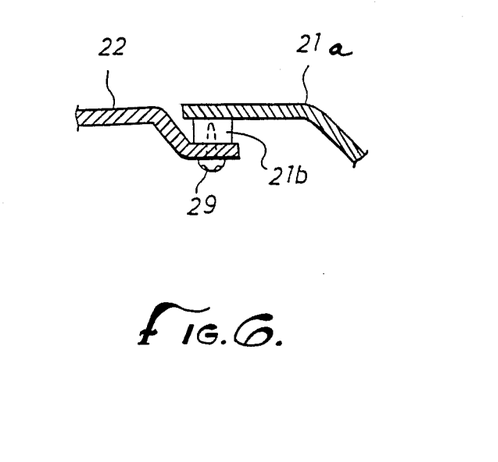
FIG. 6 is a cross-sectional front elevational view illustrating the connection between a side cover and the center cover of a first embodiment of a front cover according to the present invention.

Having described the structure of each component of the first preferred embodiment of the front cover 20, its assembly shall now be described. The upper center cover 22 may be coupled to the side covers 21 by aligning the flanged portions 22a extending from the longitudinal sides of the center cover 22 below the inwardly bent flanged portions 21a extending inward from the upper longitudinal side of the side covers 21. The flanged portions 21a and 22a, respectively, may be connected by connection means such as a screw 29, or the like, that cooperate with the screw seats 21b extending from the side cover flanged portions 21a as shown in FIGS. 2 and 6.

The side guards 23 of the front cover lower component 20B may be connected to the upper side cover 21 by fastening the connecting member 26 coupled to the inner wall of the lower end of the side cover 21 to the adjacent flanges 23a located on the inner wall of the side guard 23 with connection means such as a bolt 40 and a nut 41. When properly connected, the upper inwardly projecting peripheral edge of the lower side guard 23 will fit adjacent to the recessed flanged portion 21c at the lower longitudinal end of the upper side cover 21 so as to form a V-shaped groove 42, as best shown in FIG. 3, along the connection joint between the side cover 21 and the side guard 23. This V-shaped groove 42 accents the design and acts to improve the appearance of the entire front cover 20.

Figure 5:
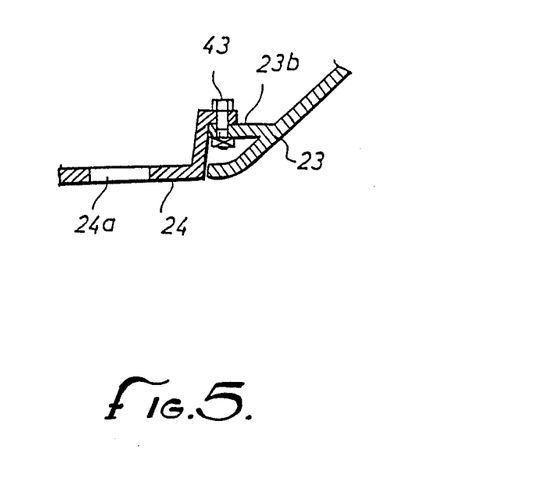
FIG. 5 is a cross-sectional plan view showing a first embodiment of the center guard portion and a first embodiment of a front cover of the present invention in a coupled condition.

The lower center guard 24 may be coupled to the side guards 23 by connecting the flanged portion 23b at the longitudinal end of the side guard 23 with the center guard 24 by fastening means such as a screw 43 (as best shown in FIG. 5). Since the center guard 24 is removably mounted to the side guards 23 as described above, it is possible to replace only the center guard portion 24 of the front cover 20. As such, the front cover may be easily and economically maintained. Further, as illustrated in FIG. 4, it is possible to provide a center guard 24 with air circulation apertures 24a therethrough so as to permit air to enter the lower portion of the front guard. Such air circulation is advantageous in assisting the louver 22c where a radiator 30 or the like is accommodated behind the front cover 20. Moreover, as replacement of the center guard 24 may be easily and economically accomplished, it is possible to arbitrarily vary the air flow through the front cover merely by installing different center guards 24 having various sized apertures therethrough. The inner fender 25 of the first preferred embodiment of the present invention may be coupled to the lower face of the front cover 20 by connecting means such as a screws 44.

When assembling the first preferred embodiment of the front cover 20 to a multi-wheeled vehicle, it is preferable to mount the lower component 20B of the front cover 20 on the front cover supporting stay "B" by means of the L-shaped connecting plate "L". The upper component 20A of the front cover 20 may then be placed on and assembled with the lower component 20B of the front cover 20.

Figure 7:
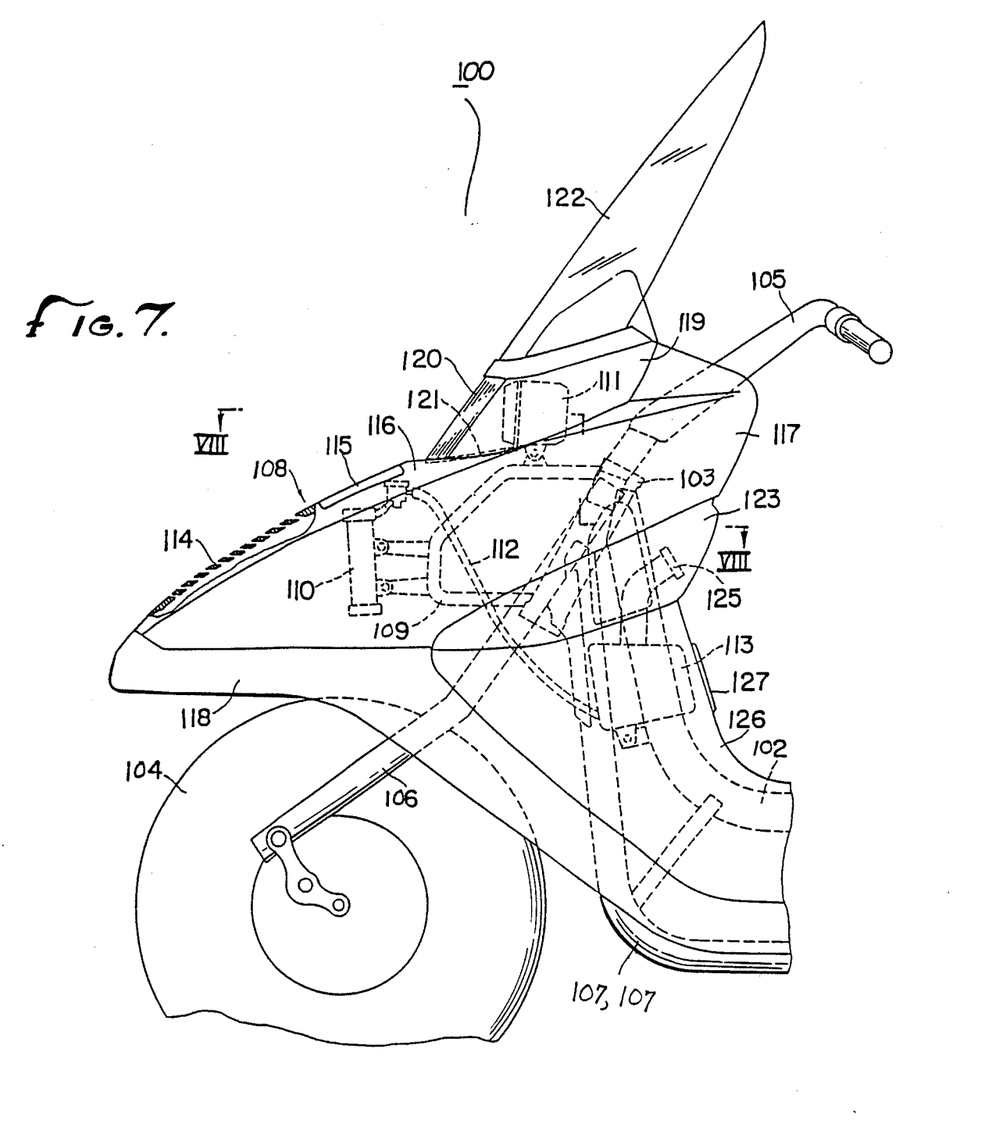
FIG. 7 is a side elevational view, partly in section, of a second embodiment of a multi-wheeled vehicle front cover according to the present invention.
Figure 8:
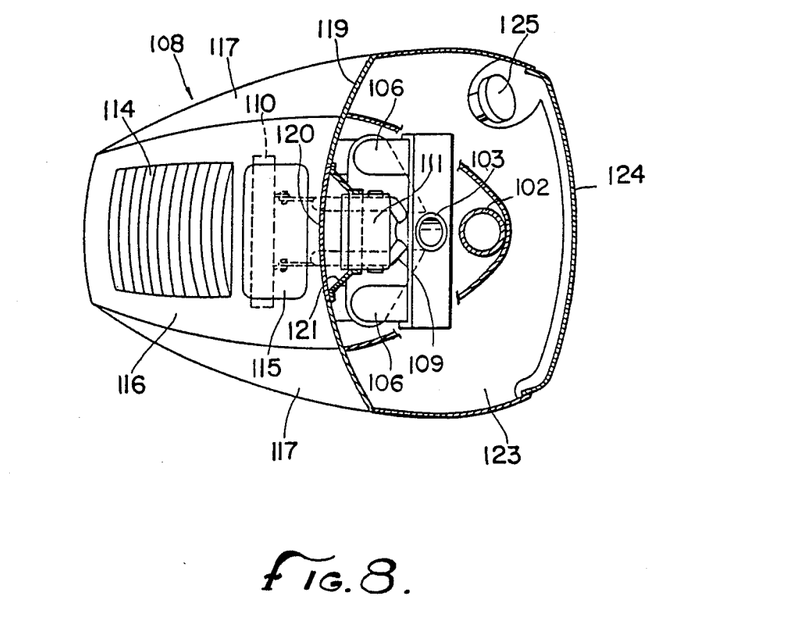
FIG. 8 is a cross-sectional view taken substantially along the line VIII—VIII of FIG. 7.
Figure 9:
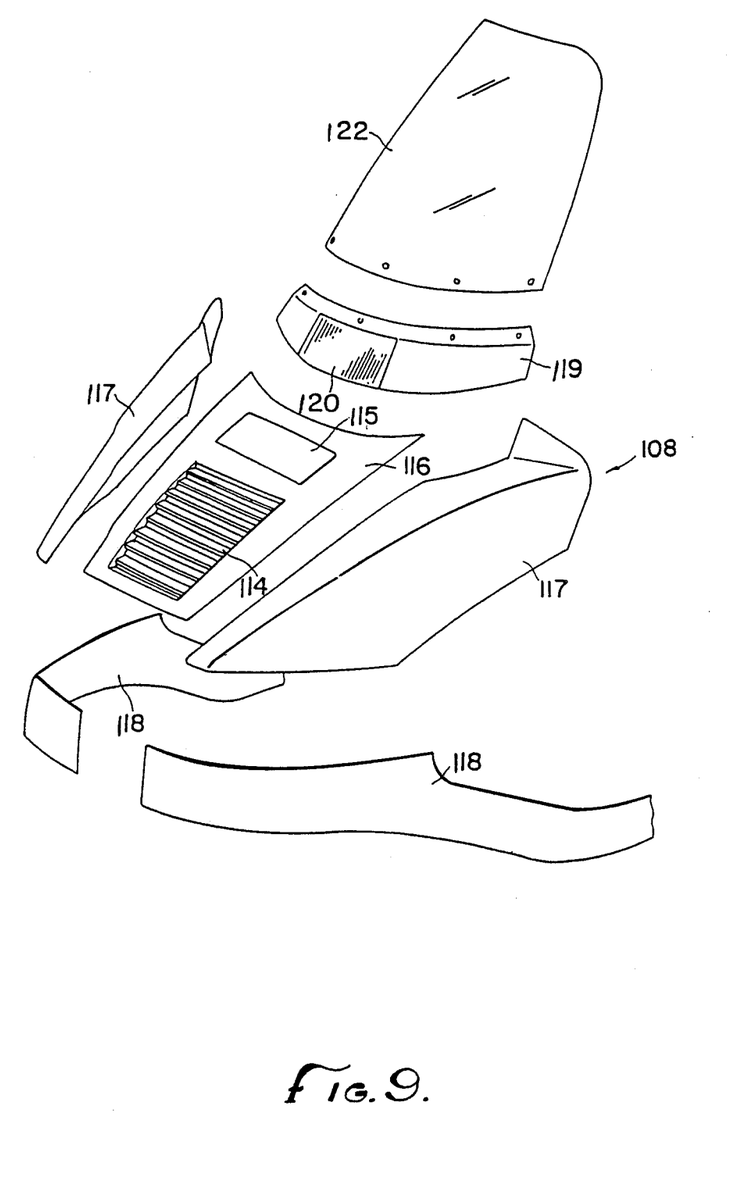
FIG. 9 is a fragmentary prospective view of a second embodiment of a front cover according to the present invention.

A second embodiment of the present invention is illustrated in FIGS. 7–9. As shown in these figures, a multi-wheeled vehicle 100 including a main frame 102 and a head pipe 103 connected to an upward forward portion of the main frame 102. The head pipe 103 has a front fork 106 rotatably mounted thereon which supports a front wheel 104. The front fork 106 may be steered by a handle 105. A pair of down tubes 107 are connected to the head pipe 103 between the main frame 102 and the end of the front fork 106 supporting the front wheel 104. Again, as in the first alternative embodiment previously disclosed, the front portion of the multi-wheeled vehicle 100 is covered by a front cover 108. A radiator 110 and a headlight 111 are disposed and supported on a mounting bracket 109 connected to the head pipe 103. A radiator reserve tank 113 is located in a spacing defined by the main frame 102 and the down tubes 107 rearwardly and downwardly of the head pipe 103 and is connected to the radiator 110 by way of a hose 112.

The second alternative embodiment of the front cover 108 includes a front panel 116 covering the front and top of the radiator 110 and having air intake holes 114 in the form of a louver for taking air into the area behind the front cover for cooling the radiator 110. A radiator maintenance lid 115 is provided to cover an aperture through the front panel 116 of the alternative front cover 108. A pair of side panels 117 arranged on opposite sides of the front panel 116 are provided for covering opposite sides of the radiator 110 and the head pipe 103. Thus, a front cover 108 is formed in a swelled manner and a streamlined profile extending forwardly of the front wheel 104 so as to provide an aerodynamic shape when moving through the wind. The front cover 108 also includes a pair of skirts 118 connected to the lower edge of the front panel 116 and the side panels 117.

A headlight panel 119 for covering the front of the headlight 111 is mounted in a rearwardly inclined relationship at the top of the second embodiment of the front cover 108. A glass section 120 is mounted at the approximate mid-portion of the head light panel 119 directly in front of the headlight 111 so as to permit light to shine therethrough. A shielding angular tube 121 is located between the headlight 111 and the glass section 120 of the headlight panel 119 so as to prevent light from scattering due to reflections and the like. A windshield 122 is mounted at the top of the headlight panel 119 and extends along the same profile line or extension line with the slope of the headlight panel 119.

An inner rack 123 for accommodating small articles therein is formed above the radiator reserve tank 113 and extends from the side panels 117. The inner rack 123 is provided with a lid 124. A water pipe 125 extends into the inner rack 123 from the radiator reserve tank 113. A center cover 126 is located below the inner rack 123 and covers the main frame 102 and the down tubes 107. A view lid 127 through which the level of the liquid in the radiator reserve tank 113 may be visually confirmed is located at a position in the center cover 126 opposite the reserve tank 113.

With the structure described above, the front cover 108, the headlight panel 119 and the windshield 122 are effectively formed in an integral and continuous relationship, in spite of the location of the radiator 110 at the front portion of the vehicle body, so as to permit air to flow smoothly about the front of the multi-wheel vehicle during operation. As such, the structure contributes an excellent aerodynamic characteristic to the vehicle so as to reduce the fatigue of the rider and also improve the rider's comfort during operation, especially during operation in the rain. Moreover, the cooling efficiency of the radiator may be improved by the location of the front apertures 114 so as to permit air flow substantially directly onto the radiator 110 or by incorporating the air circulation apertures previously described.

Figure 10:
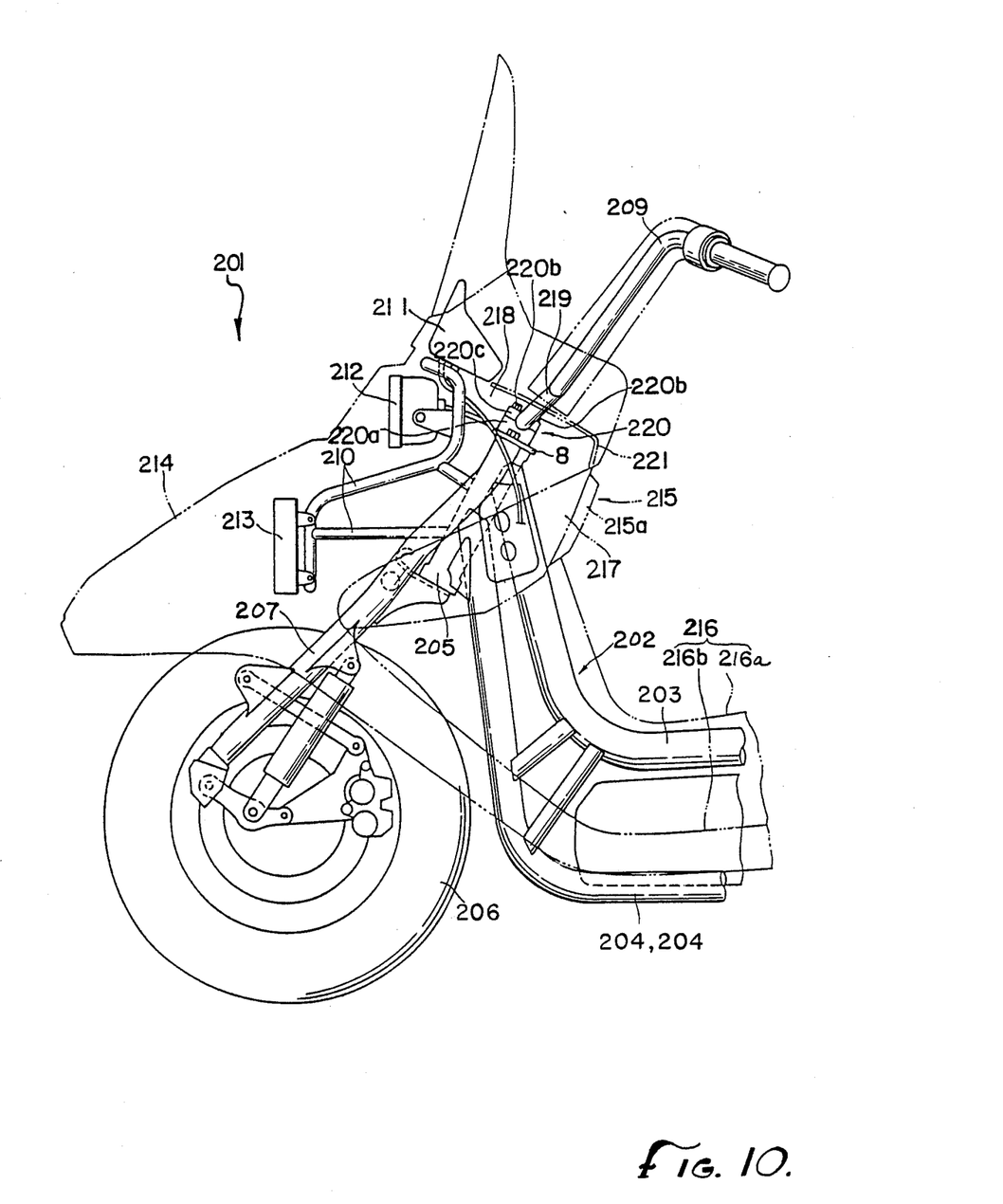
FIG. 10 is a side elevational view of the front portion of a multi-wheeled vehicle including a front cover of the present invention.
Figure 11:
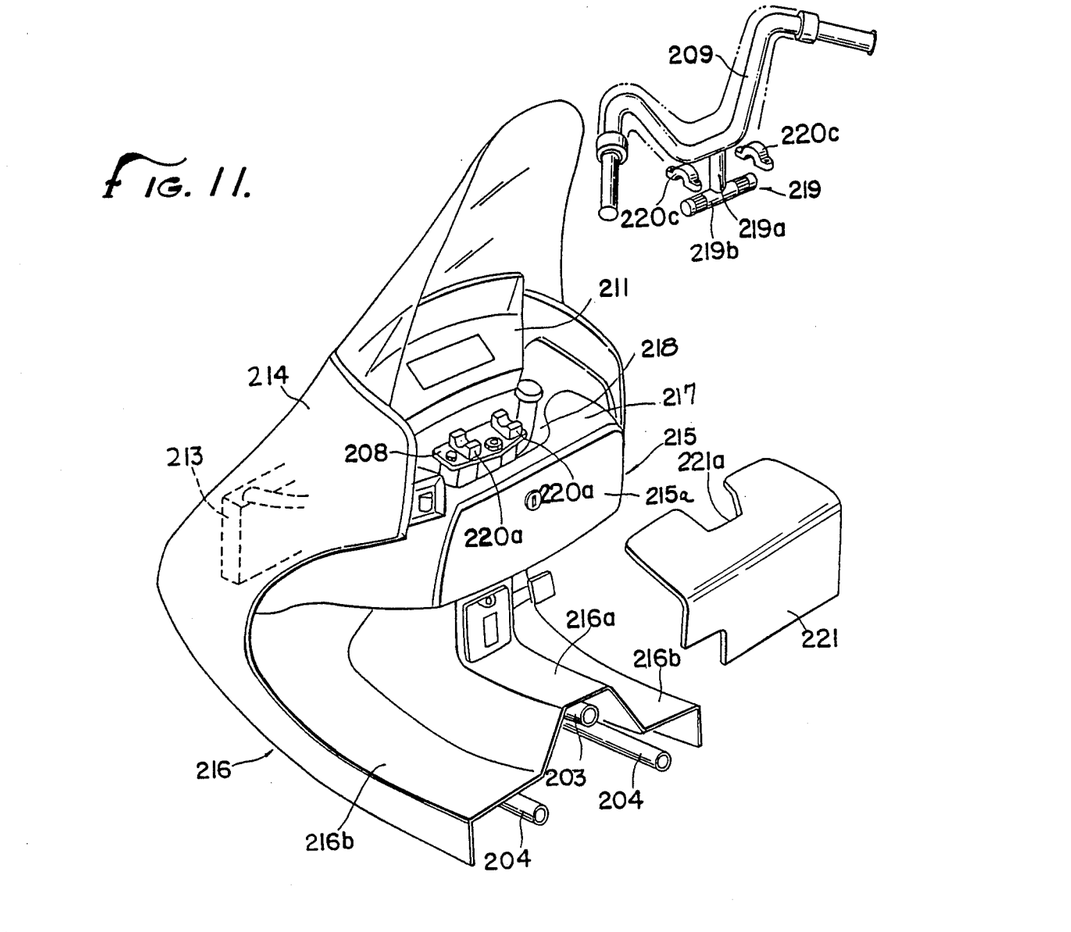
FIG. 11 is a fragmentary prospective view showing a handlebar mounting structure for multi-wheeled vehicles and a front cover of the present invention.

A third embodiment of the present invention is illustrated in FIGS. 10 and 11. There, as in the above embodiments, a multi-wheeled vehicle such as a motorcycle, a motor scooter or any other multi-wheeled vehicle 201 so constructed has a body frame 202 and a main pipe 203 which extends vertically and rearwardly from the main body frame 202. A pair of sub-pipes 204 having a substantially U-shaped profile as viewed from the side of the multi-wheeled vehicle 201 extend below and on opposite sides of the main pipe 203. A head pipe 205 is securely mounted on the main pipe 203 and sub-pipes 204. A steering stem (not-shown) extends through and is supported for rotation on the head pipe 205. A top bridge 208 is securely mounted on the not-shown steering stem. The top bridge 208 extends between the two front forks 207 on which the front wheel 206 is rotatably mounted. A steering mechanism such as handlebars 209 is mounted on the top bridge 208.

A stay or support mechanism 210 is mounted on and extends forwardly from the head pipe 205. Various instruments and devices including an instrument panel 211, a headlight 212 and a radiator 213 are securely mounted on the stay 210. A front cover 214 is connected to the body frame 202 for integrally covering the forward portion of the front fork 207 and to protect the various instruments and devices at the front portion of the multi-wheeled vehicle 201. In addition, an inner cover 215 and a foot receiving station cover 216 are also provided on the body frame 202. The foot receiving station cover 216 includes a center cover 216a projecting so as to cover the main pipe 203 and a low step floor 216b arranged so as to cover the sub-pipes 204. The center cover 216a and the step floor 216b are formed in an integral relationship with each other and extend in the rearward direction of the body from the front and inner covers 214 and 215, respectively. The inner cover 215 has integrally formed therewith an accommodating portion for accommodating small items therein. An opening and closing lid 215a is mounted on the accommodating portion, thereby forming an inner box 217.

Electrical wires and lines for the instruments and devices mounted on the multi-wheeled vehicle 201 may be collected and routed in a common area between the inner box 217 and the instruments and devices through an opening 218 formed in the inner box 217 and into the area between the front cover 214 and the inner cover 215. The previously described top bridge 208 is also located in the area of opening 218.

A handle shaft 219 is connected to the handlebar 209 steering mechanism. The handle shaft 219 includes a vertical pipe portion 219a and a horizontal pipe portion 219b which is connected to the vertical pipe portion 219a in an inverted T-configuration. The upper portion of the vertical pipe portion 219a is securely connected through welding or the like to the lower portion of the handlebar steering mechanism 209.

A pair of handle holders 220 are located in a juxtaposed relationship at the upper portion of the top bridge 208. The handle holders 220 act to connect the handle shaft 219 to the top bridge 208. Each of the handle holders 220 includes a semi-circular lower receiving member 220a securely mounted to the top bridge 208. A semi-circular upper holding member 220c fastens to the lower receiving member 220a by fastening means such as a bolt 220b so as to clamp the ends of the horizontal pipe member 219b of the handle shaft 219. Mounting of the handlebar steering mechanism 209 on the top bridge 208 by way of the inverted T-shape handle shaft 219 in this manner assures a vertical spacing between the handlebar steering mechanism 209 and the top bridge 208 due to the presence of the vertical pipe member 219a, thereby facilitating the routing of electrical wires and connections and minimizing the amount of movement of such wires and the like due to movement of the handlebar steering mechanism 209.

A cover member 221 is provided for covering the opening 218 in the inner cover member 215. The cover member 221 is removably mounted to allow maintenance of the several electrical lines and other connections disposed in the space defined by the front cover 214 and the inner cover 215. A recess 221a is formed in the front of the cover member 221 so as to permit the vertical pipe 219a of the handle shaft 219 to pass therethrough. By minimizing the size of the recess aperture 221a in cover member 221, the flow of air from the interior space defined by the front cover member 214 and inner cover 215 may be minimized thereby reducing the amount of waste heat from the radiator 213 which flows onto the rider. Similarly, minimization of this aperture acts to inhibit rain water and dust from entering this area.

As will be understood by those skilled in the art, although the drawings and descriptions herein above have been directed primarily to a two-wheeled vehicle, the present invention can also be applied to a three-wheeled vehicle or other multi-wheeled vehicles. Moreover, the advantages of one embodiment may be applied to another embodiment without departing from the spirit of the invention. As such, the limitations of the embodiments described above are for purposes of example only and should not be construed to limit the scope of the claim appended hereto.

What is claimed:

1. A multi-wheeled vehicle including a frame having a head pipe, a steering mechanism operatively mounted to said head pipe and connecting a handlebar to a vehicle front wheel, a headlight mounted on said frame for directing light forwardly of said head pipe, and a vehicle front cover attached to said frame, said vehicle front cover comprising:
    a front panel overlying said front wheel;
    a windshield positioned forwardly of said steering mechanism;
    a light-pervious cover interposed between said front panel and said windshield forwardly of said headlight;
    said front panel, said windshield and said light cover each being upwardly and rearwardly inclined to define substantially aerodynamically continuous surface means spaced forwardly of said frame;
    oppositely spaced side panels extending from lateral sides of said front panel, windshield and light cover to form an enclosure enclosing said head pipe, steering mechanism and said headlight;
    means forming an instrument panel positioned forwardly of said steering mechanism and extending between said side panels, said means containing an opening accommodating passage of said steering mechanism; and
    a removable rear panel interposed between said handlebar and said steering mechanism forming a barrier restricting air flow from said enclosure.

2. The vehicle front cover according to claim 1 in which said front and side panels are mutually detachable.

3. The vehicle front cover according to claim 1 in which said vehicle includes a radiator mounted on said frame within said enclosure.

4. The vehicle front cover according to claim 1 in which the steering mechanism of said vehicle contains a bridge; means on said bridge for detachably mounting said handlebar; said removable rear panel being interposed between said bridge and said handlebar.

5. The vehicle front cover according to claim 4 in which said handlebar contains a generally T-shaped mounting stem; means on said bridge for detachably connecting said mounting stem; and recess means in said removable rear panel receiving said handlebar mounting stem.

6. The vehicle front cover according to claim 3 including means forming louvers in said front panel for conducting air in heat transfer relation to said radiation.

7. The vehicle front cover according to claim 5 in which said side panels contain air ducts for ventilating heated air from said enclosure.

8. A multi-wheeled vehicle including a frame having a head pipe, a steering mechanism operatively mounted to said head pipe and connecting a handlebar to a vehicle front wheel, a vehicle front cover attached to said frame and forming an enclosure enclosing said head pipe and said steering mechanism, and a radiator mounted on said frame within said enclosure, said vehicle front cover comprising means forming an instrument panel positioned forwardly of said steering mechanism, said means containing an opening accommodating passage of said steering mechanism; and a removable rear panel interposed between said handlebar and said steering mechanism forming a barrier restricting air flow from said enclosure.

9. The vehicle front cover according to claim 8 in which the steering mechanism of said vehicle contains a bridge; means on said bridge for detachably mounting said handlebar; said removable rear panel being interposed between said bridge and said handlebar.

10. The vehicle front cover according to claim 9 in which said handlebar contains a generally T-shaped mounting stem; means on said bridge for detachably connecting said mounting stem; and recess means in said removable rear panel receiving said handlebar mounting stem.

11. The vehicle front cover according to claim 8 including means forming louvers in said front panel for conducting air in heat transfer relation to said radiator.

12. The vehicle front cover according to claim 11 in which said side panels contains air ducts for ventilating heated air from said enclosure.

* * * * *

UNITED STATES PATENT AND TRADEMARK OFFICE
CERTIFICATE OF CORRECTION

PATENT NO. : 4,799,568
DATED : January 24, 1989
INVENTOR(S) : KOICHI TANAKA

It is certified that error appears in the above-identified patent and that said Letters Patent is hereby corrected as shown below:

In claim 6 (Col. 8, l. 54), delete "radiation" and insert therefor -- radiator --.

In claim 7 (Col. 8, l. 55), delete "5" and insert therefor -- 6 --.

Signed and Sealed this

Twenty-fourth Day of October, 1989

Attest:

DONALD J. QUIGG

Attesting Officer

Commissioner of Patents and Trademarks